United States Patent [19]
Shimizu

[11] Patent Number: 6,019,322
[45] Date of Patent: Feb. 1, 2000

[54] CABLE BED AND CABLE LAYING METHOD

[75] Inventor: Shohachi Shimizu, Gifu, Japan

[73] Assignee: Mirai Industries Co., Ltd, Gifu, Japan

[21] Appl. No.: 08/964,787

[22] Filed: Nov. 5, 1997

[30]     Foreign Application Priority Data

Nov. 18, 1996  [JP]  Japan ................................ 8-306696
Oct. 1, 1997   [JP]  Japan ................................ 9-268917

[51] Int. Cl.$^7$ ......................................................... F16L 3/00
[52] U.S. Cl. ........................ 248/49; 174/158 R; 248/68.1
[58] Field of Search ............................... 248/53, 68.1, 73, 248/49, 55; 174/158 R; 254/134 R, 134.3 FT, 134.3 PA

[56]          References Cited

U.S. PATENT DOCUMENTS

4,139,142  2/1979  Maple et al. ............................ 248/55
5,102,073  4/1992  Lestenkof, Jr. .......................... 248/49
5,335,887  8/1994  Torrens et al. .......................... 248/49

*Primary Examiner*—Ramon O. Ramirez
*Attorney, Agent, or Firm*—Cantor Colburn LLP

[57]          ABSTRACT

A roller-support rung arrangement for a cable bed and a cable laying method utilizing the arrangement are disclosed. The cable bed has roller rungs and support rungs on which support blocks are to be mounted. Generally, the roller rungs are mounted on the side rails at a higher level than the support rungs so that a cable drawn onto the cable bed initially contacts only the roller rungs for easy drawing of the cable. Generally, the support blocks are provided on the support rungs after the cable is initially laid on the cable bed such that the support blocks can substantially support the cable weight.

6 Claims, 9 Drawing Sheets

CABLE BED AND CABLE LAYING METHOD

BACKGROUND OF THE INVENTION

1. Field of the Invention

This invention generally relates to a ladder-type cable bed. This invention more particularly relates to a ladder-type cable bed incorporating roller rungs, which utilizes cable support blocks to be mounted on support rungs after an initial cable laying operation. This invention also relates to a cable laying method using such a cable bed.

2. Prior Art

Figure 12:
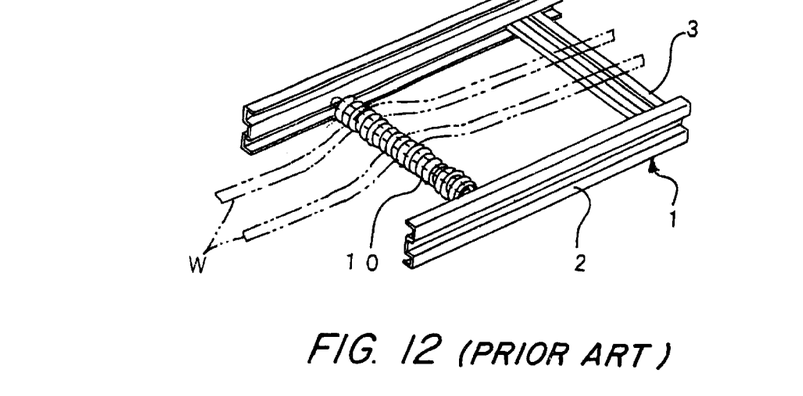
FIG. 12 is a partial perspective view of a prior art cable bed.
Figure 13:
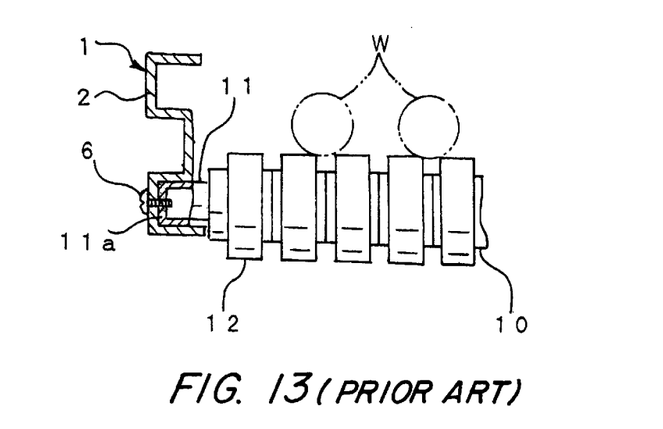
FIG. 13 is a front view, showing in detail the roller rung used in the prior art cable bed of FIG. 12.

Japanese Laid-Open Utility Model Publication 62-172210 discloses a ladder-type cable bed 1 incorporating & plurality of roller rungs 10 as shown in FIGS. 12 and 13, FIG. 12 being a partial perspective view and FIG. 13 being a partial front view with a longitudinally extending side wall 2 sectioned.

Each roller rung 10 comprises a plurality of disk rollers 12 turnably mounted on an axial shaft 11 which has a projection 11a (with a threaded hole) on each end thereof. Each projection 11a is fixedly connected to a corresponding side wall 2 with a threaded bolt 6 screwed through a hole provided on the side wall 2 from outside into the threaded hole of the projection 11a. A cable W (shown in phantom) generally touches two disk rollers 12 of each roller rung 10 (which turn on the axial shaft 11) when drawn onto the cable bed 1, and that portion of the cable W is supported by the two disk rollers 12 as shown in FIG. 13.

The cable bed 1 includes a plurality of such roller rungs 10 mounted in parallel at intervals across two parallel side walls 1. The cable bed 1 also includes a plurality of support rungs 3 mounted in parallel at intervals across the side walls 2 among the roller rungs 10. In general, more support rungs 3 are incorporated in a cable bed 1 than roller rungs 10 as shown in FIG. 14 partly because roller rungs 10 are much more costly to manufacture and much more fragile than support rungs 3.

In general, a cable or pipe to be drawn onto a (ladder-like) cable bed is heavy and long, and generates (during a cable laying or drawing operation) considerable friction with the cable bed or its rungs. The roller rungs 10 are expected to assist in drawing a cable W onto the cable bed 1 while the support rungs 3 support a much larger part of the cable weight in an attempt to reduce cable traction force.

Figure 14:
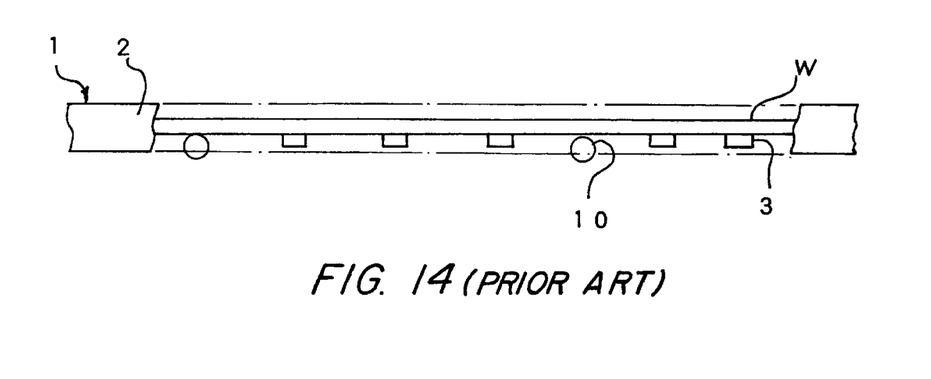
FIG. 14 is a schematic side view, showing a conventional height relationship between conventional roller rungs and support rungs.

Since the support rungs 3 are provided on the cable bed 1 at substantially the same level with the roller rungs 10 as shown in FIG. 14 in schematic partial side view, the friction generated between the cable W and the support rungs 3 during a cable laying operation can be so large that the cable drawing operation will be substantially hindered, since conventionally the cable W must be and is mostly supported by the support rungs 3.

It is advantageous, therefore, that a cable W does not contact support rungs 3 while initially drawn onto the cable bed 1 but contacts only the roller rungs 10.

Such an arrangement may be provided by installing on side walls 2 support rungs 3 substantially lower than roller rungs 10. However, in such an arrangement, the roller rungs 10, relatively fewer in number, are destined to shoulder all weight of the cable W laid on the cable bed 1, which will be too much a burden for such fragile conventional roller rungs 10.

In addition, such an arrangement is impractical conventionally, for it is such support rungs 3 that are to support cable weight. Besides holding side walls 2 firmly together, conventional support rungs 3 are provided to support as well as frictionally hold cables W laid on a cable bed 1 so that the cables W once laid on the cable bed 1 will not be displaced longitudinally or laterally.

It is impractical either to provide a cable bed 1 with conventional roller rungs 10 alone, for it is required to incorporate too many roller rungs 10, which will be much more costly than utilizing support rungs 3.

Accordingly, it is an object of the present invention to provide a roller-support rung arrangement, which can efficiently assist in reducing traction force from cable drawing and can stably hold a cable or cables once laid thereon.

It is another object of the present invention to provide a cable bed incorporating such a roller-support rung arrangement, which can provide an easy laying of a cable or cables and stably hold the cable or cables once laid thereon.

It is a further object of the present invention to provide a cable laying method using such a cable bed, which can provide an easy laying of a cable or cables.

SUMMARY OF THE INVENTION

Those objects and other objects of the present invention will be accomplished through use of a cable bed incorporating a roller-support rung arrangement provided by the present invention in conjunction with a cable laying method according to the present invention.

A roller-support rung arrangement of the present invention is provided by using a plurality of roller rungs, a plurality of support rungs and a plurality of support blocks.

A roller rung of the present invention can be any rung having rollers which can appropriately turn in cable laying directions, however, it is advantageous that such a roller rung is made sturdy enough to support substantial weight.

A roller rung of the present invention includes a plurality of roller disks or drums which are arranged in an elongated casing having an elongated upper opening provided therethrough such that the roller drums can independently rotate within the casing in cable laying directions with their upper portions protruding or exposing from the elongated opening to directly receive a cable thereon. The elongated casing has connection means with which to be mounted in a plurality across a pair of elongated side rails which extend longitudinally in parallel.

Such roller drums can be partitioned with partition panels within the casing and turn by means of turnable engagement provided between the partition panels and the roller drums. Such roller drums may even be provided to turn substantially above the casing turnably supported by "tall" partition panels which protrude from the opening and are fixedly housed in the casing.

A support rung to provide a cable bed system of the present invention together with a cable bed is prepared with an identical length with a roller rung but generally with a shorter height or vertical thickness such that when incorporated in a plurality in a cable bed, a cable initially contacts only the roller rungs and does not contact or hardly contacts the support rungs.

Each support rung is to be provided thereon with a support block after an initial cable laying operation. Each support block is generally given a dimension such that when mounted on a support rungs the combined height of the support rung and the support block is substantially even with that of a roller rung so that the support block can substantially contribute to supporting and holding a cable laid thereon in cooperation with the roller rungs and other support blocks.

A cable bed of the present invention incorporates such a roller-support rung arrangement generally by mounting such roller rungs and support rungs (initially without support blocks) across a pair of generally L-shaped, longitudinally extending side rails. As set forth, support blocks are to be respectively installed on the support rungs after a cable or cables are initially laid on the cable bed contacting substantially only the roller rungs so that the roller rungs and support rungs with the support blocks thereon can eventually share the weight of the cable or cables laid thereon.

Alternatively, it is possible to provide the combined height of a support block and a support rung to substantially exceed the height of a roller rung such that a cable or cables laid on a cable bed are eventually supported substantially by the support blocks on the support rungs alone.

A cable laying method according to the present invention generally includes the steps: drawing a cable onto such a cable bed without support blocks from an end thereof or from a selected middle location of the cable bed with an assistance from rotation of the roller drums of the roller rungs; and attaching a support block on each support rung under the cable with appropriate mounting means after that initial cable laying operation. The cable can be less strenuously laid and then stably supported on the cable bed.

BRIEF DESCRIPTION OF THE DRAWINGS

The present invention is described hereinafter in detail through several unlimiting embodiments and the accompanying drawings, in which.

DESCRIPTION OF PREFERRED EMBODIMENT

Figure 1:
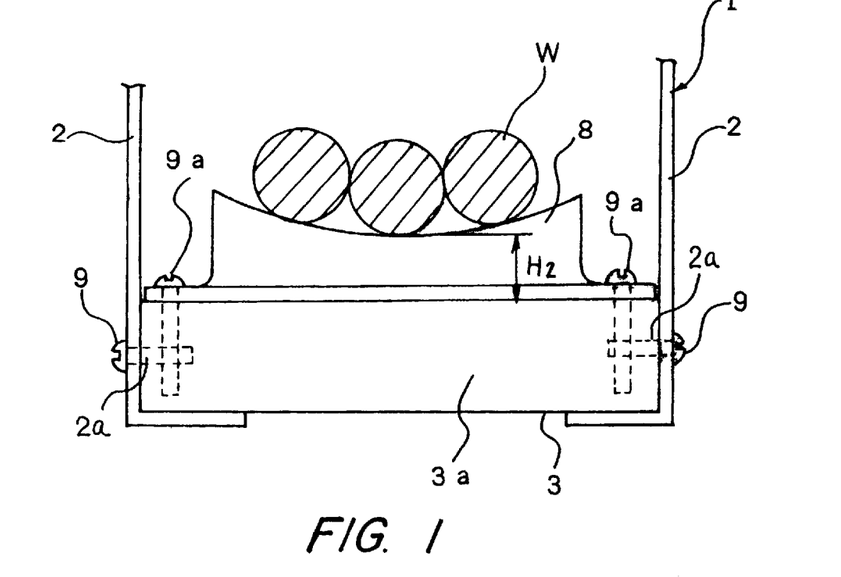
FIG. 1 is a front view of a cable bed system according to an embodiment of the present invention.
Figure 2:
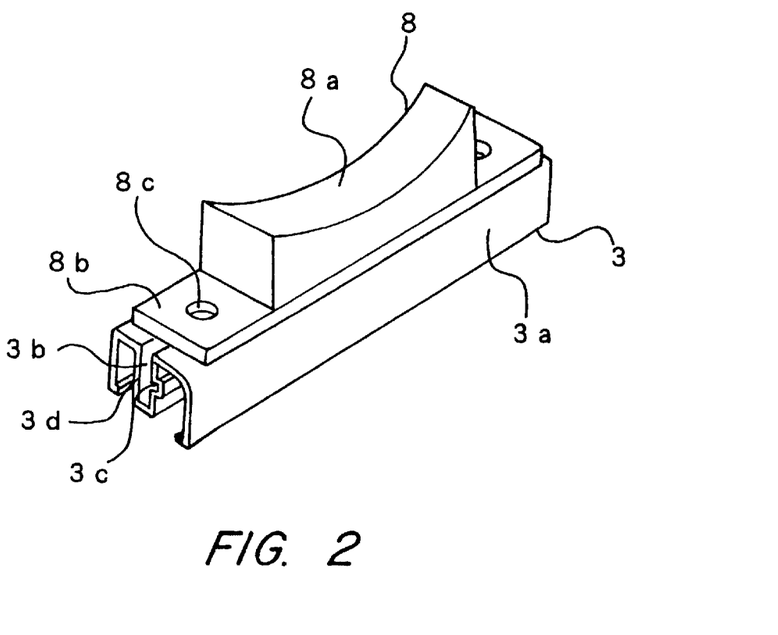
FIG. 2 is a perspective view of a support rung and a support block used in the cable bed system of FIG. 1.
Figure 2A:
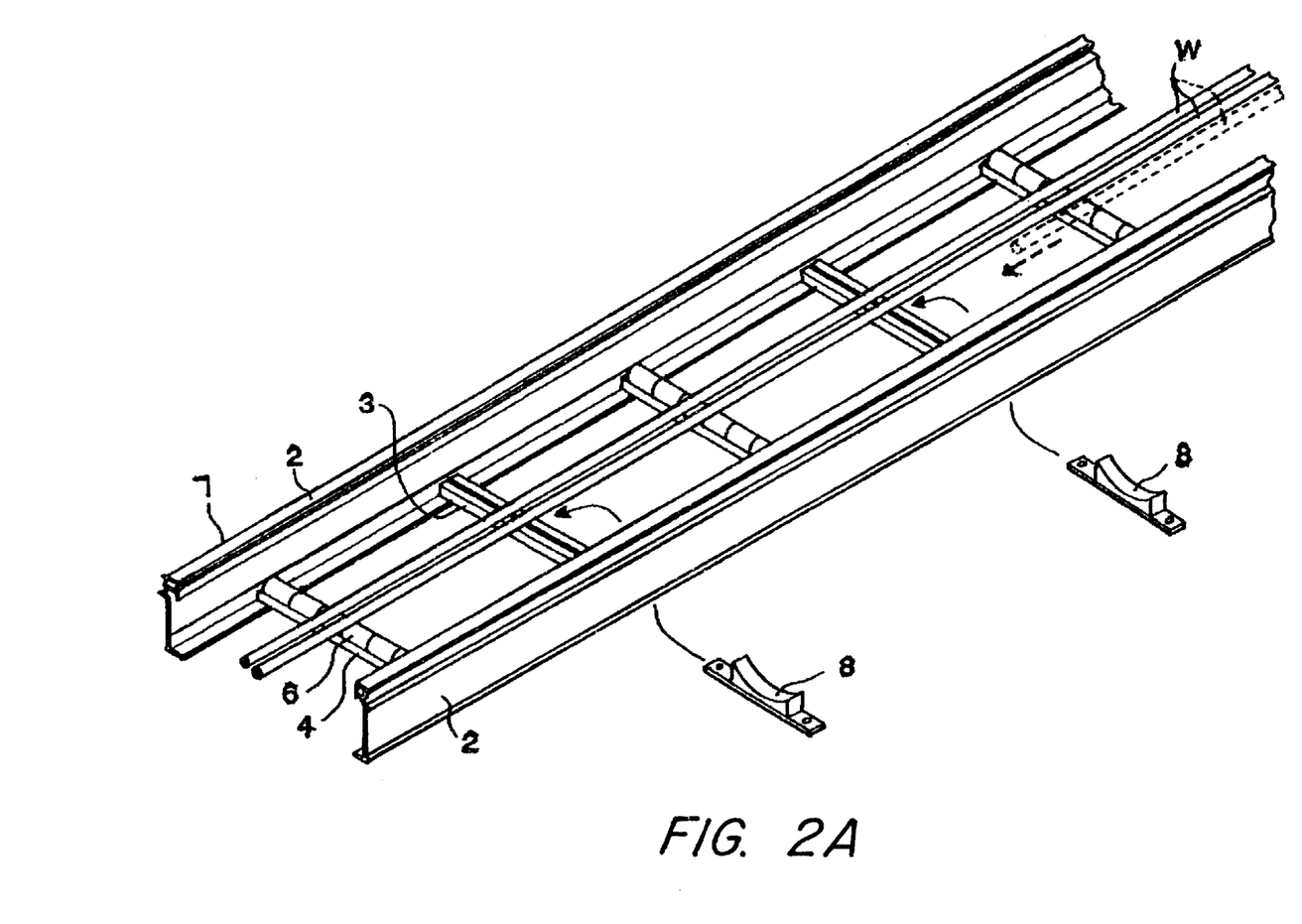
FIG. 2A is a perspective view of the invention with the support block shown exploded way through the balance of the invention.
Figure 3:
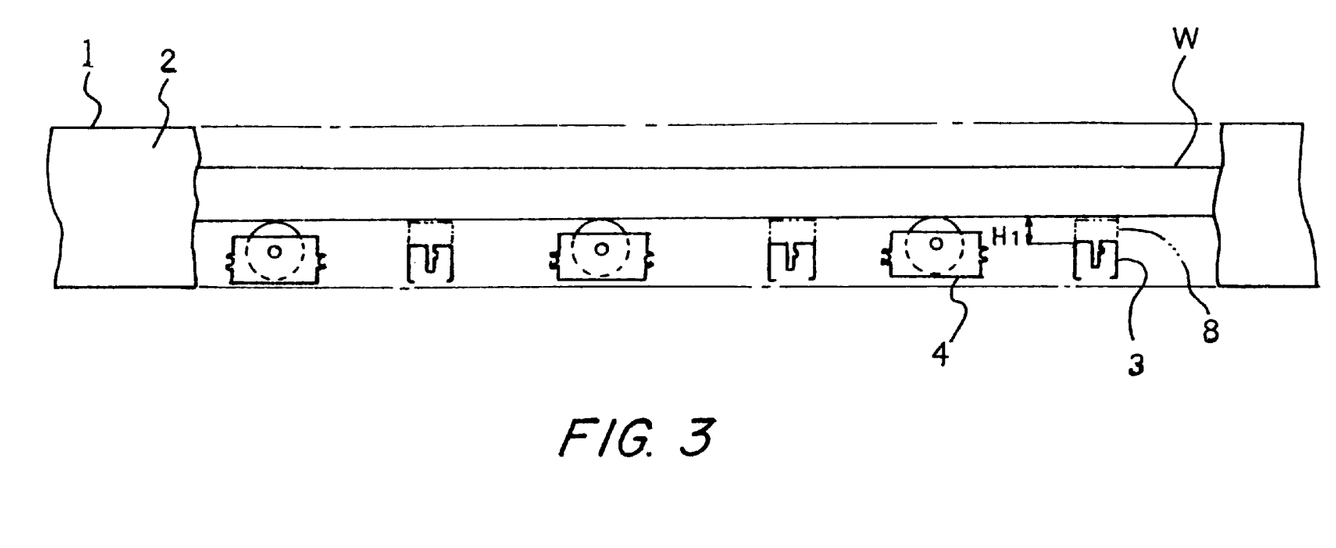
FIG. 3 is a schematic side elevational view, showing a height relationship between roller rungs and support rungs with support blocks mounted thereon (in phantom) according to the present invention.

In FIGS. 1 to 3A, a cable bed 1 according to an embodiment of the present invention is shown, comprising a pair of L-shaped side rails 2 running in parallel, a plurality of support rungs 3 mounted across the side rails 2 at appropriate intervals, and a plurality of roller rungs 4 mounted across the side rails 2 at appropriate intervals among the support rungs 3. An arrangement of roller rungs 4 and support rungs 3 along the side rails 2 is shown in FIG. 3. Other arrangements of roller rungs 4 and support rungs 3, such as a repetition of a unit consisting of two support rungs and one roller rung or one support rung and two roller rungs, are possible.

In FIG. 1, each support rung 3 has a support block 8 thereon, on which are laid three cables W. The support blocks 8 are to be attached on the support rungs 3 by means of threaded bolts 9a after a cable or cables W are initially laid over the support rungs 3.

The side rails 2 is advantageously made of aluminum, however, other appropriate materials may be utilized as desired. The support rung 3 in this embodiment is made of aluminum, however, other materials may be utilized as desired.

In FIG. 2, the support rung 3 formed of a rung body 3a and the support block 8 are shown in detail. The support rung 3 has a first groove 3b formed through the center portion of the rung body 3a which opens upward. A second groove 3c which opens sideway is formed through its inner wall within the first groove 3b, as shown in FIG. 2.

Figure 3A:
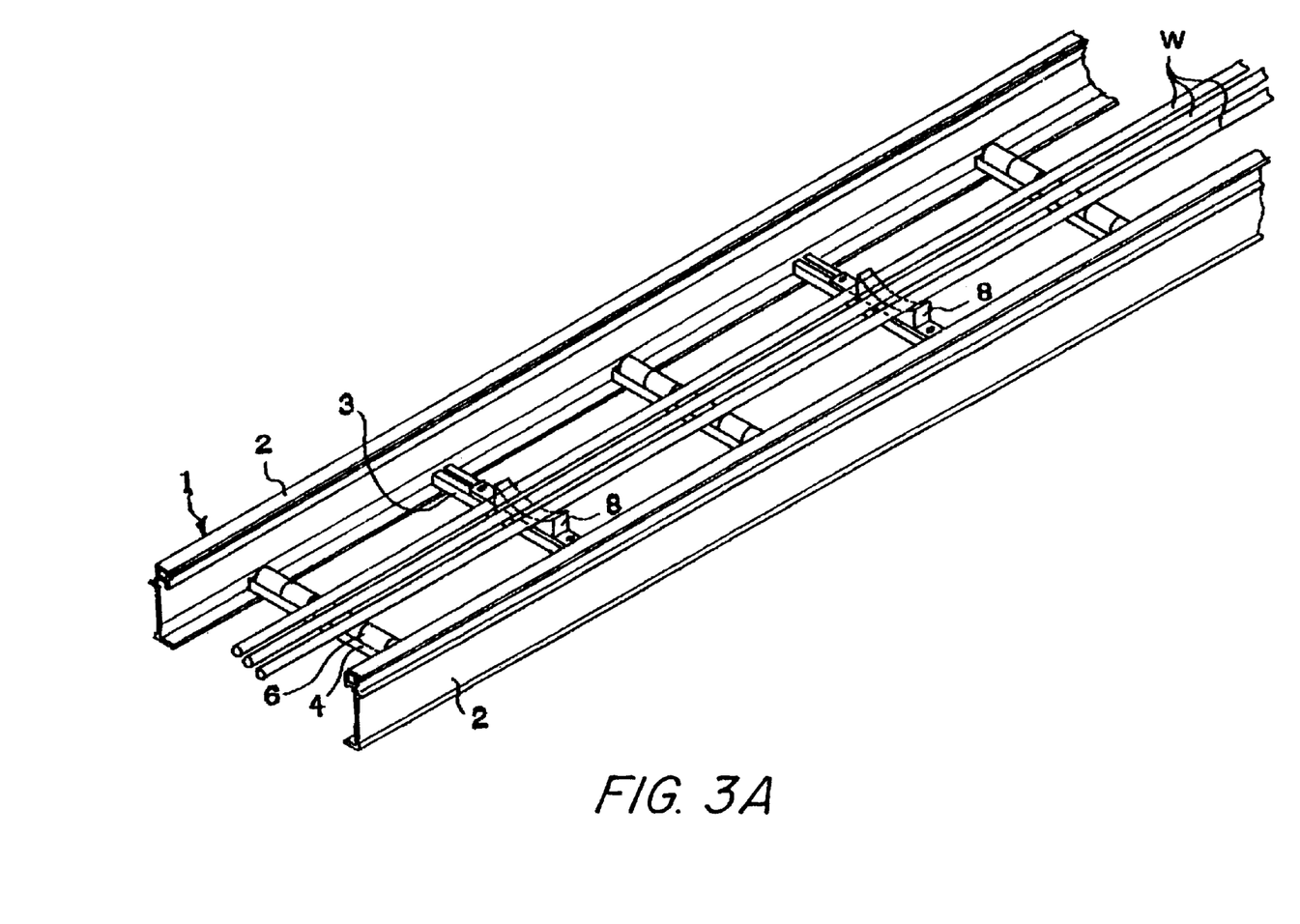
FIG. 3A is a perspective illustration of the invention in completed form.

FIG. 2A is a full perspective view of the invention with the supports which are detailed in FIG. 2 moved laterally from the drawing in order to provide an understanding of the removability of the support rung in order to provide for the functionality of the invention. More specifically, as is stated herein, support blocks 8 are removed from the balance of the invention in order to provide easier pulling of the cable onto the support since it would then only contact the roller rungs 4. Subsequent to pulling the cable onto the support rack the support blocks 8 would be inserted under the cables on support rungs 3 to provide support for the cables W. Once the support blocks 8 are inserted in the invention the cable W will be supported virtually horizontally and very smoothly without having significant sagging points between the roller rungs. Referring to FIG. 3A the support blocks 8 are shown inserted in the balance of the invention to show their exact location.

Referring now back to FIG. 2, support block 8 has an arch support face 8a (the center portion being the lowest) on a plate member 8b, and a first bolt hole 8c is provided adjacent to each end of the support block 8, as shown in FIG. 2. The support block 8 is to be fixed on the support rung 3 with first threaded bolts 9a respectively screwed from above through the first bolt holes 8c into the first groove 3b whose width is made slightly smaller than the diameter of the first threaded bolts 9a. The elongated inner wall portion of the first groove 3b will be provided with thread etches as the first threaded bolts 9a is forcibly advanced thereinto, firmly fixing the support block 8 on the support rung 3 by means of thread engagement between the first threaded bolts 9a and the formed thread etches.

Each side rail 2 has a number of second bolt holes 2a provided therein generally in a longitudinal alignment. The support rung 3 is fixed on two such side rails 2 running in parallel with two second threaded bolts 9 respectively and correspondingly screwed through two second bolt holes 2a from outside of the side rails 2 into the respective end openings of the second groove 3c whose width is made slightly smaller than the diameter of the second threaded bolts 9. The second groove 3c will also be provided with thread etches as the second threaded bolts 9 is forcibly advanced thereinto, firmly fixing the support rung 3 on the side rails 2. In this embodiment, each end portion of the support rung 3 is placed on the longitudinally extending bottom shelf of the corresponding L-shaped side rail 2.

It is advantageous to provide such a support rung 3 as light and sturdy as possible. In this embodiment, the support rung 3 is molded hollow as shown in FIG. 2 to satisfy both advantages. It is also advantageous to provide such a support block 8 as light as possible. A foam material may be advantageously utilized.

Figure 9:
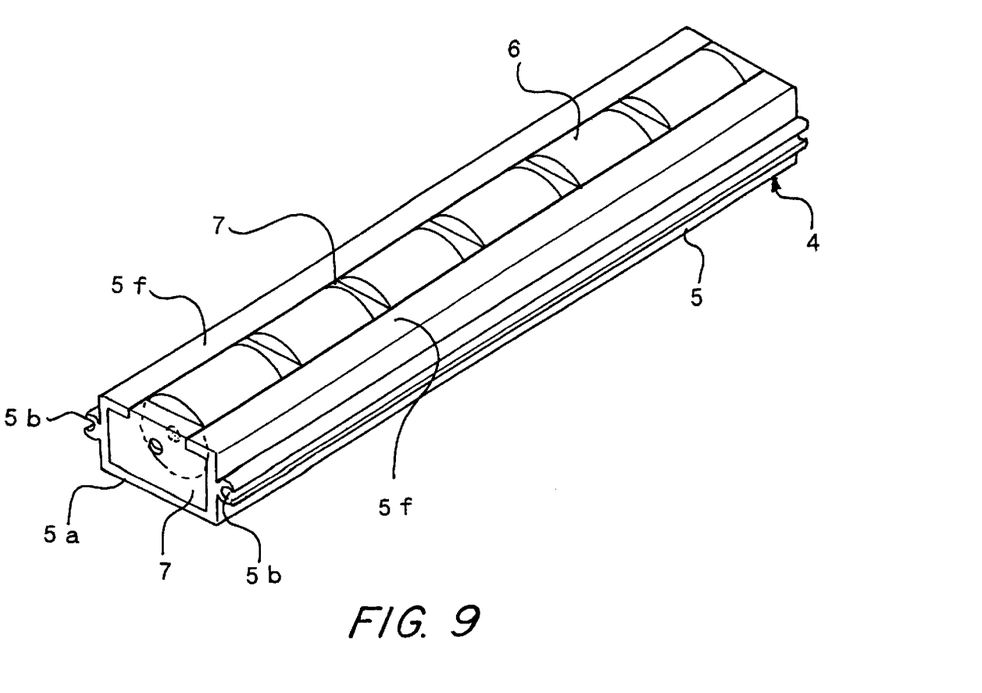
FIG. 9 is a perspective view of a roller rung according to an embodiment of the present invention.
Figure 10:
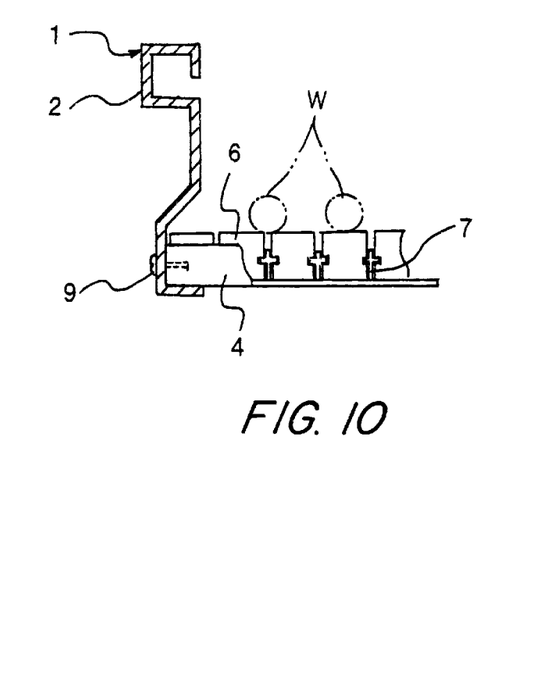
FIG. 10 is a partially sectioned front view of a cable bed incorporating the roller rung of FIG. 9 in a plurality.

In FIG. 9 is shown a roller rung 4 to be incorporated in a plurality in the cable bed 1, comprising an elongated casing 5 formed of an elongated body 5a having an elongated upper opening provided between two elongated upper plate portions 5f, and a plurality of roller drums 6 housed in the casing 5 exposing their upper portions from the opening to directly receive a cable or cables W and rotate in cable laying directions within the casing 5. The upper plate portions 5f prevent the roller drums 6 from falling off the casing 5.

Figure 11:
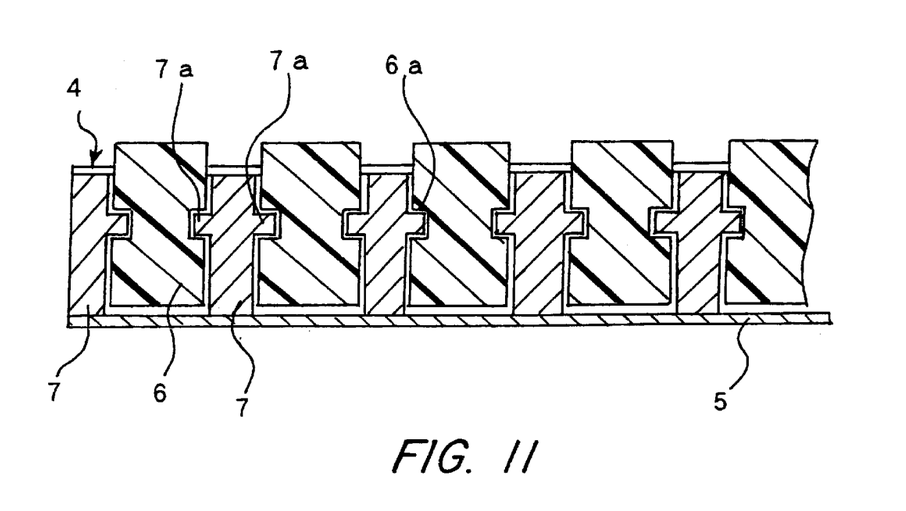
FIG. 11 is a partial sectional view of the roller rung of FIG. 9.

The roller drums 6 have an axial cylindrical indentation 6a on each side and are partitioned with partition panels 7 having axial cylindrical protrusions 7a which are slightly smaller in diameter than the indentations 6a as shown in FIG. 11. The protrusions 7a correspondingly and turnably engage the axial indentations 6a of the roller drums 6 so that the roller drums 6 can freely and independently rotate within the casing 5 without contacting the caging S. Though not shown, it is possible to provide axial indentations on the partition panels 7 and axial protrusions on the roller drums 6.

Alternatively, the roller drums 6 may rotate on an elongated axial shaft (not shown) which penetrates the axial centers of the roller drums 6 and partition panels 7. Though not shown, the partition panels 7 may be provided "tall" or protruding from the opening of the casing 5 such that the roller drums 6 turn substantially above the opening. Other types of roller rungs such as shown in FIG. 13 (prior art) may be appropriately incorporated in the cable bed 1 of the present invention as long as they can appropriately facilitate initial drawing of a cable or cables.

In this example, the casing 5 has a bolt groove 5b on each side of the body 5a as shown in FIG. 9. The roller rung 4 is fixed on the side rails 2 with four second threaded bolts 9 screwed through corresponding four second bolt holes 2a into the corresponding bolt grooves 5b from outside of the side rails 2. As set forth, each bolt groove 5b has a width slightly smaller than the diameter of the second threaded bolt 9. Alternatively, the bolt groove 5b may be a cylindrical groove with an elongated opening whose width is smaller than the diameter of the second threaded bolt 9.

It is to be noted that the roller rungs 4 are made considerably taller (vertically thicker) than the support rungs 3 such that a cable W drawn onto the cable bed 1 initially contacts only the roller rungs 4 and does not contact (or hardly contacts) the support rungs 3 as shown in FIG. 3, where support blocks 8 are shown in phantom having a height H1. In this embodiment, height H2 shown in FIG. 1 between the lowest point (center) of the support face 8a and the bottom surface of the support block 8 is provided nearly equal to height H1.

Alternatively, it is possible to mount support rungs 3 on the side rails 2 substantially lower than roller rungs 4 to attain the foregoing purpose with appropriate mounting means. In this case, the height or vertical thickness relationship between the roller rungs 4 and support rungs 3 is not essential.

In the following, a cable laying method according to the present invention which utilizes a foregoing cable bed 1 is described.

A cable W is drawn onto a cable bed 1 from an end thereof or at a selected midportion thereof, which is received only on the roller rungs 4. The rotation of the roller drums 6 which contact the cable W assists the drawing and substantially reduces cable traction force.

Then the support blocks 8 are then attached on the support rungs 3 under the cable W. Since there is generally provided space between the laid cable W and the support rungs 3, the attachment of the support blocks 8 on the support rungs 3 should not be a problem.

When all the support rungs 3 are provided thereon with a support block 8, the cable W is stably held on the cable bed 1. The cable W will hardly be displaced longitudinally as the support blocks 8 firmly hold the cable W thereon by means of friction generated between the support faces 8a and the cable W. The cable W will not be displaced sideway, either, because in this embodiment, the support face 8a is configured of an arch with its ends higher than its center.

Figure 4:
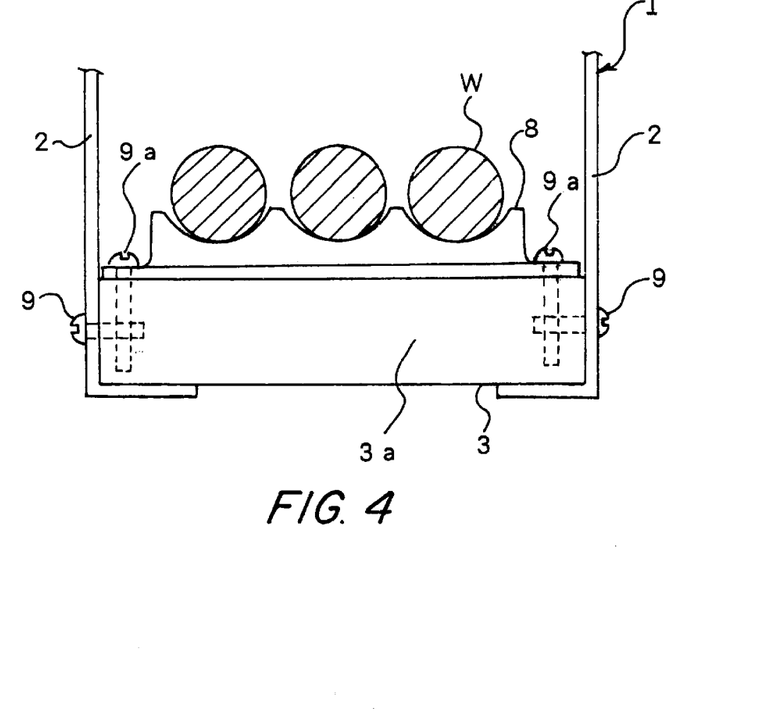
FIG. 4 is a front view of a cable bed system according to another embodiment of the present invention.

FIG. 4 shows another embodiment of the support block 8, having a plurality of arch support faces, which exclusively and individually hold cables W, providing improved prevention of dislocation of cables W.

Figure 5:
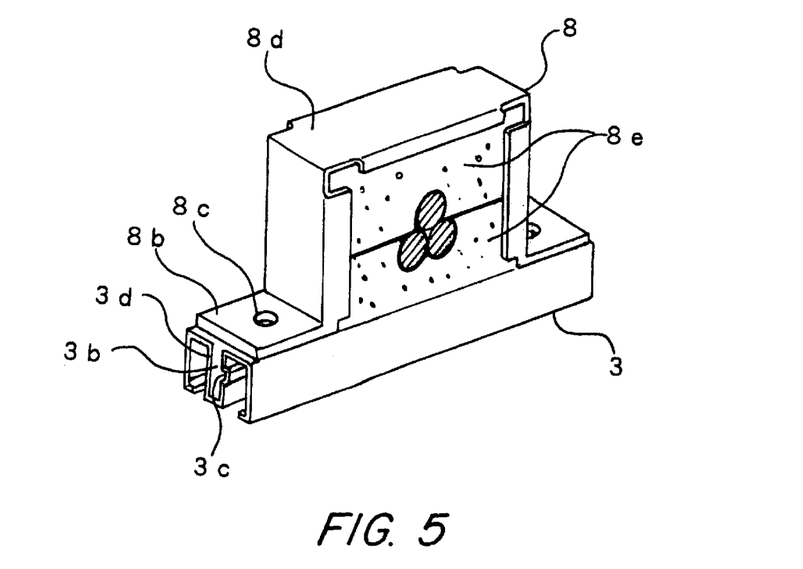
FIG. 5 is a perspective view of a support rung and a support block according to another embodiment of the present invention.
Figure 6:
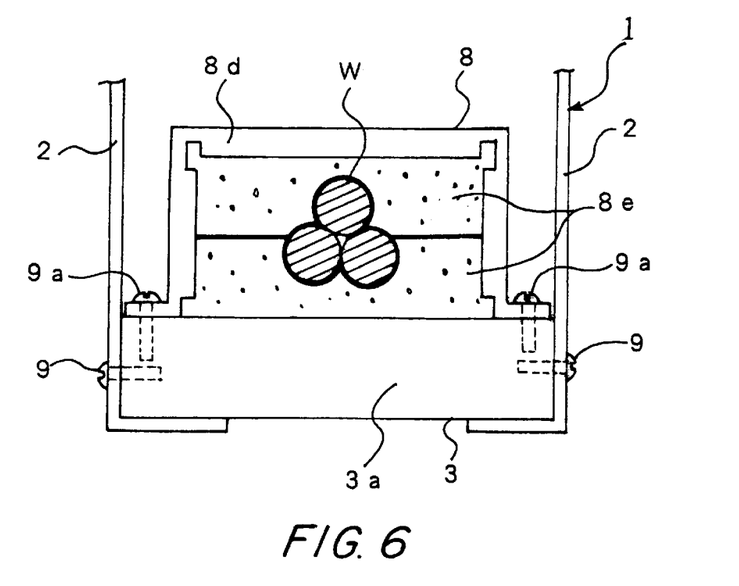
FIG. 6 is a front view of a cable bed system incorporating in a plurality the support rung and the support block of FIG. 5.

In FIGS. 5 and 6, another support block 8 is shown, comprising a cover frame 8d having two first bolt holes 8c, and two holder blocks 8e of an elastic material which are to be enclosed in the cover frame 8d. Neither holder block 8e initially has a cable holding portion, however, since the material is elastic and deformable, a cable or cables W can be pressed into the holder blocks 8e and firmly sandwiched between the holder blocks 8e, as shown in FIG. 5.

It is to be noted that the top surface level of the lower holder block 8e when installed in a cable bed 1 is generally even with the top portions of the roller drums 6. However, the top surface level of the lower holder block 8e may be above the top portions of the roller drums 6. Such support blocks 8 are capable of providing still improved prevention of cable displacement, which will stable sustain cables W in events of even earthquakes.

Figure 7:
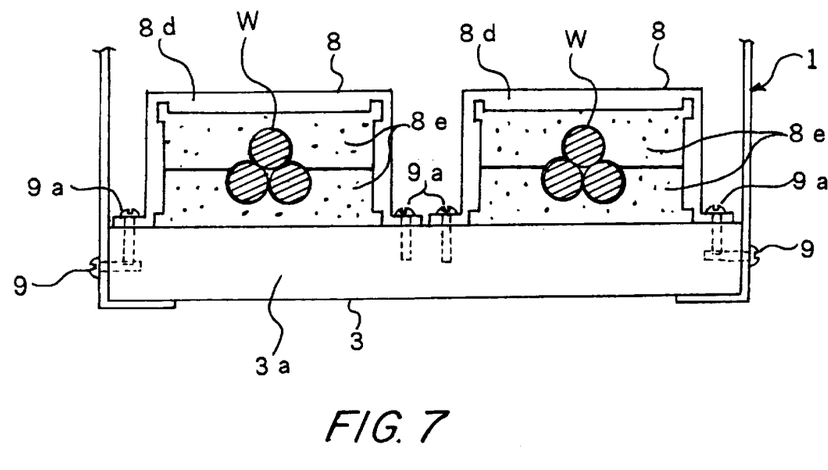
FIG. 7 is a front view of another cable bed system incorporating the support block of FIG. 5 in pairs on each support rung.

A plurality of such "small" support blocks 8 can be mounted on a single support rung 3 as shown in FIG. 7.

Figure 8:
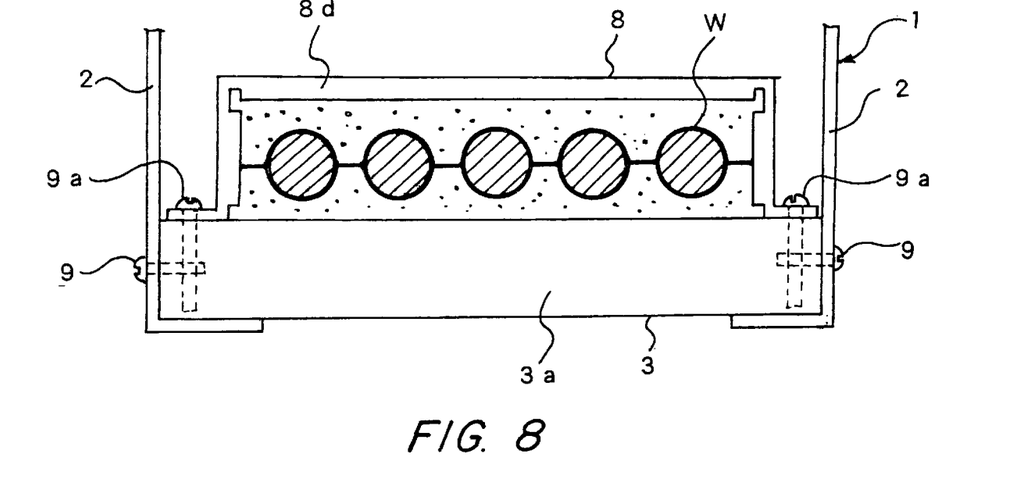
FIG. 8 is a front view of a cable bed system incorporating another support block in a plurality according to another embodiment of the present invention.

Alternatively, an "elongated" support block 8 may be provided, such as shown in FIG. 8, basically identically with the foregoing support block 8.

Alternatively, the holding blocks Be can be made of a "hard" material instead of an elastic material, in which case, a plurality of semicircular cable holding ditches of an appropriate size are formed in each holding block 8e, in corresponding alignment with those formed in the other holding block 8e such that the ditches can cooperatively and individually hold cables W firmly.

It is to be noted that it is possible to provide height H2 shown in FIG. 1 substantially greater than height H1 shown in FIG. 3. That is, with those types of support rungs 3 and support blocks 8, the overall height of the support rung 3 and support block 8 is greater than that of the roller rung 4, in which case, a cable W laid on the cable bed 1 will be eventually supported on the support blocks 8 alone, the roller rungs 4 contributing only at the time of initial cable drawing.

It is additionally possible to provide a support rung 3 and a support block 8 as a unit (not shown). In such a case, the support block 8 is originally attached on the support rung 3, for example, by appropriate pivotal means (not shown) such that the support block 8 can be pivoted in place onto the support rung 3 after a cable W is initially laid on the cable bed 1.

It is also possible to initially arrange a cable bed 1 with only a plurality of roller rungs 4. A plurality of support rungs 3 each advantageously with a support block 8 mounted thereon may be additionally provided on the cable bed 1 after an initial cable laying operation.

The roller rung 4, support rung 3 or support block 8 may be provided with other types of attachment means as long as the respective attachments are appropriately provided.

As described earlier, the support rungs 3 may have a height or thickness substantially equal to that of the roller rungs 4 or even greater, in which case, the support rungs 3 are mounted on the side rails 2 at a substantially lower level than the roller rungs 4.

It should be noted that the present invention provides laying pipes such as water pipes or gas pipes as well.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A ladder-type cable bed, comprising:
   a pair of longitudinally extending side rails;
   a plurality of roller rungs mounted between the side rails along the longitudinal extent of said side rails, an axis of rotation of said roller rungs intersecting said side rails; and
   a plurality of support rungs mounted between the side rails along the longitudinal extent of said side rails along with the roller rungs, said support rungs being positioned such that a cable or pipe initially laid on the cable bed will contact substantially only the roller rungs,
   a plurality of support blocks attachable to said support rungs, said support blocks contacting said cable or pipe to provide support therefor, said blocks being attached to said support rungs after said cable or pipe is initially laid on said cable bed, the cable or pipe being substantially supported by the support blocks.

2. A ladder-type cable bed, comprising:
   a pair of longitudinally extending side rails;
   a plurality of roller rungs mounted between the side rails along the longitudinal extent of said side rails; and
   a plurality of support rungs mounted between the side rails along the longitudinal extent of said side rails along with the roller rungs such that a cable or pipe initially laid on the cable bed will contact substantially only the roller rungs,
   a plurality of support blocks attachable to said support rungs, said support blocks contacting said cable or pipe to provide support therefor, said blocks being attached to said support rungs after said cable or pipe is initially laid on said cable bed, the cable or pipe being substantially supported by the support blocks and said roller rungs.

3. A cable or pipe laying method using a ladder-type cable bed of claim 1 or 2, comprising the steps:
   drawing at least one cable or pipe onto said cable bed; and
   respectively mounting said support blocks on said support rungs in place, said support blocks after mounting supporting at least some of the weight of said cable or pipe.

4. A ladder-type cable bed system, comprising:
   a) a cable bed comprising:
      i) a pair of longitudinally extending side rails;
      ii) a plurality of roller rungs mounted between said side rails along the longitudinal extent of said side rails; and
      iii) a plurality of support rungs mounted between the said rails along the longitudinal extent of said side rails along with the roller rungs such that a cable or pipe initially laid on the cable bed will contact substantially only the roller rungs; and
   b) a plurality of support blocks to be respectively mounted in place on the support rungs after at least one cable or pipe is laid on the cable bed, said support blocks after mounting being in contact with said cable or pipe so that the cable or pipe can be substantially supported by the support blocks and said roller rungs.

5. A ladder-type cable bed system, comprising:
   a) a cable bed comprising:
      i) a pair of longitudinally extending side rails;
      ii) a plurality of roller rungs mounted between said side rails along the longitudinal extent of said side rails; and
      iii) a plurality of support rungs mounted between the side rails along the longitudinal extent of said side rails along with the roller rungs such that a cable or pipe initially laid on the cable bed will contact substantially only the roller rungs; and
   b) a plurality of support blocks to be respectively mounted in place on the support rungs after at least one cable or pipe is laid on the cable bed so that the cable or pipe can be substantially supported by the support blocks.

6. A cable or pipe laying method using a ladder-type cable bed system of claim 4 or 5 comprising the steps of:
   drawing at least one cable or pipe onto said said cable bed; and
   respectively mounting said support blocks on said support rungs in place, said support blocks after mounting supporting at least some of the weight of said cable or pipe.

* * * * *

UNITED STATES PATENT AND TRADEMARK OFFICE
CERTIFICATE OF CORRECTION

PATENT NO. : 6,019,322
DATED : February 1, 2000
INVENTOR(S) : Shohachi Shimizu

Page 1 of 1

It is certified that error appears in the above-identified patent and that said Letters Patent is hereby corrected as shown below:

Column 1,
Line 14, after "incorporating" delete "&" and insert therefor -- a --

Column 2,
Line 62, after "support" delete "rungs" and insert therefor -- rung, --

Column 5,
Line 38, after "the" (second occurrence), delete "caging S" and insert therefor -- casing 5 --

Column 6,
Line 58, after "blocks" delete "Be" and insert therefor -- 8e --

Signed and Sealed this

Eleventh Day of June, 2002

*Attest:*

*Attesting Officer*

JAMES E. ROGAN
*Director of the United States Patent and Trademark Office*